US010165118B1

(12) United States Patent
Agarwal

(10) Patent No.: US 10,165,118 B1
(45) Date of Patent: Dec. 25, 2018

(54) INTELLIGENT CONTEXT AWARE CONTACT WORKFLOW ENGINE MANAGER

(71) Applicant: Amazon Technologies, Inc., Seattle, WA (US)

(72) Inventor: Saket Agarwal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 15/614,503

(22) Filed: Jun. 5, 2017

(51) Int. Cl.
*H04M 3/00* (2006.01)
*H04M 3/493* (2006.01)
*H04L 12/66* (2006.01)
*H04M 3/487* (2006.01)

(52) U.S. Cl.
CPC .......... *H04M 3/493* (2013.01); *H04L 12/66* (2013.01); *H04M 3/487* (2013.01)

(58) Field of Classification Search
CPC ........ H04M 3/493; H04M 3/487; H04L 12/66
USPC ...................... 379/265.01–265.14
See application file for complete search history.

(56) References Cited

U.S. PATENT DOCUMENTS

| 8,542,816 | B2 | 9/2013 | Kaufman et al. | |
| 8,958,542 | B1 | 2/2015 | Kaufman | |
| 9,026,577 | B1 * | 5/2015 | Johnston | G06Q 10/103 709/202 |
| 9,219,818 | B2 | 12/2015 | Kaufman | |
| 2002/0006186 | A1 * | 1/2002 | Sanders | H04M 1/24 379/1.01 |
| 2002/0077819 | A1 * | 6/2002 | Girardo | G10L 25/69 704/260 |
| 2002/0188650 | A1 * | 12/2002 | Sun | G06F 9/4843 718/105 |
| 2004/0008825 | A1 * | 1/2004 | Seeley | H04M 3/22 379/32.01 |
| 2008/0183538 | A1 * | 7/2008 | Hamadi | G06Q 10/06 705/7.14 |
| 2008/0304632 | A1 * | 12/2008 | Catlin | H04M 3/4938 379/88.04 |
| 2010/0305997 | A1 * | 12/2010 | Ananian | G06F 9/5038 705/7.27 |
| 2011/0150189 | A1 * | 6/2011 | Kulkarni | H04M 3/323 379/32.01 |
| 2018/0143854 | A1 * | 5/2018 | Kumar | G06F 9/505 |

* cited by examiner

*Primary Examiner* — William Deane, Jr.
(74) *Attorney, Agent, or Firm* — Lowenstein Sandler LLP

(57) ABSTRACT

A workflow engine manager receives a request to interact with a contact workflow, wherein the contact workflow comprises a starting instruction block to be invoked to start execution of a contact workflow for a contact, wherein the contact is associated with a contact identifier, and wherein the contact workflow comprises a plurality of instruction blocks. The workflow engine manager determines, using at least one instruction block invoked during a previous interaction with the contact workflow or a different contact workflow for the contact, the starting instruction block of the plurality of instruction blocks to be invoked in the contact workflow for the contact. The workflow engine manager sends a notification to a contact workflow engine to cause the contact workflow engine to start execution of the contact workflow for the contact at the starting instruction block.

20 Claims, 8 Drawing Sheets

INTELLIGENT CONTEXT AWARE CONTACT WORKFLOW ENGINE MANAGER

BACKGROUND

Interactive voice response (IVR) is a technology that allows a computer system to interact with a human caller through the use of dual tone multi-frequency touchtone input via the keypad of a telephone. Similar methods of allowing a computer system to interact with a human (or "contact") electronically include chat/chatbot interactions, Simple Message Service (SMS)/Text message interactions, email interactions, web applications, and mobile applications. Collectively, these methods are commonly referred to as contact "channels". Contact workflows, for example including instruction blocks to facilitate these types of interactions, are commonly implemented across different channels such that one workflow has little, if any, context for a contact's previous interactions with the same or different workflow channels in an enterprise. Additionally, in the event of an unexpected failure with a workflow, conventional implementations typically involve restarting a workflow from its starting point rather than at the point of failure. Embodiments discussed herein provide technical solutions to problems introduced by these types of systems.

BRIEF DESCRIPTION OF THE DRAWINGS

The embodiments described herein will be understood more fully from the detailed description given below and from the accompanying drawings. The drawings should not be taken to limit the application to the specific embodiments, but are for explanation and understanding only.

DETAILED DESCRIPTION

Figure 1:
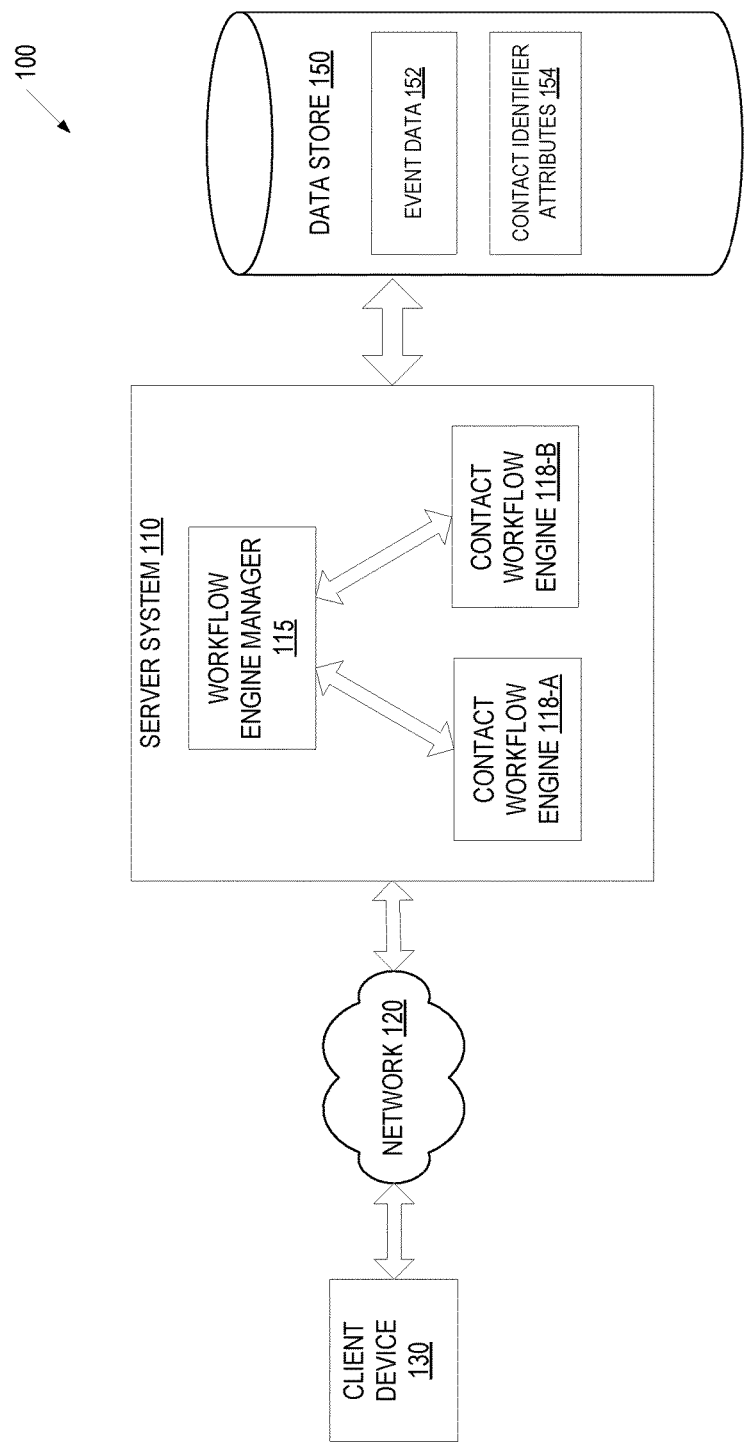
FIG. 1 is a block diagram of an example network architecture including an interactive contact run-time engine, in accordance with one embodiment.

Embodiments described herein relate to providing a context aware framework to facilitate management of customer contact interactions across multiple contact channels. In one embodiment, a workflow engine manager can receive contextual information from contact workflow engines (contact channels) that execute various contact workflows within the system, storing that contextual information for use in customizing subsequent invocations of the contact workflows. When a workflow is initiated by a contact, the associated workflow engine can interact with the workflow engine manager to customize the workflow based on the stored context for previous interactions with that same workflow or other workflows in the system. The workflow engine manager may analyze the stored event data for the previous workflow interactions for that contact (e.g., the same user, caller, etc.) to determine an appropriate starting point within the workflow or to provide a customized user experience based on the previous interactions. Thus, the workflow engine manager can provide a more personalized and efficient user experience for users of workflows within the framework.

In conventional contact workflow environments, user interactions with various workflow channels are not preserved in way that they may be shared across the channels. For example, if a customer of an online store attempts to cancel a purchase order using an IVR workflow, but is unsuccessful, any attempt to repeat the process typically involves the customer starting the IVR workflow from the very beginning. Thus, the customer may need to repeat entry of information previously entered and traversing multiple blocks in the IVR in order to return to the particular part of the workflow that completes the desired task. Similarly, subsequent interactions with a different workflow channel (e.g., a call to a live-agent) typically involve the customer repeating information already provided to the IVR workflow. Thus, in conventional implementations, the user experience is inefficient and disjointed as it often requires repeated entry of the same information multiple times.

The workflow engine manager of the present disclosure can remedy the above noted and other deficiencies by capturing event data for interactions of a particular user contact with contact workflows for any of the workflow channels in the system. The workflow engine manager can use the captured data to drive the presentation of subsequent invocations of the workflows by the user contact. In one embodiment, the workflow engine manager can utilize captured event data for a user's interaction with a particular contact workflow to determine a starting point for a subsequent interaction with that workflow. For example, if a workflow fails to complete successfully for a user contact, and the user contact attempts to retry the workflow, the workflow engine manager may use the captured data to identify the point of failure for the previous attempt and restart the workflow at that point so the user need not restart the workflow from the beginning.

In another embodiment, the workflow engine manager can utilize captured event data for a user's interaction with a particular contact workflow to determine a starting point for a subsequent interaction with a different workflow channel. For example, if a workflow fails to successfully complete a task for a user contact, and the user contact attempts to use a second workflow channel to complete that task, the workflow engine manager may use the captured data to identify the point of failure in the first workflow, determine a starting point in the workflow of the second workflow channel that provides similar functionality, and start the workflow of the second channel at that starting point. Similarly, if the user attempts to contact a live-service channel (e.g., calling an agent), the workflow engine manager can provide the captured event data for the previous interaction to an agents console so that the caller need not repeat information to the agent that had already been provided during the previous interaction. Thus, the framework can provide a more efficient workflow for a contact by eliminating repetitive steps from subsequent workflow invocations, and customizing user interactions with various workflow channels, drastically improving the user experience.

FIG. 1 is a block diagram of an example network architecture 100 in which embodiments described herein may operate. The network architecture 100 may include server system 110 and a client device 130 capable of communicating with server system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 120 may have any suitable communication range associated therewith and may include, for example, public networks (e.g., the Internet), metropolitan area networks (MANs), wide area networks (WANs), local area networks (LANs), or personal area networks (PANs). In addition, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Client device 130 may include any type of mobile computing device (e.g., that has a finite power source) or traditionally non-portable computing device. Client device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Client device 130 may also be a traditionally non-portable computing device such as a desktop computer, a server computer, or the like. Client device 130 may be configured with functionality to enable execution of an application to interact with one or more contact workflow engines, such as that provided by contact workflow engines 118-A and 118-B of server system 110.

Communication between the server system 120 and the client device 130 may be enabled via any communication infrastructure, such as public and private networks. One example of such an infrastructure includes a combination of a wide area network (WAN) and wireless infrastructure, which allows a user to use client device 130 to interact with contact workflow engines 118-A, 118-B without being tethered to the server system 110 via hardwired links. The wireless infrastructure may be provided by one or multiple wireless communications systems. One of the wireless communication systems may be a Wi-Fi access point connected with the network 120. Another of the wireless communication systems may be a wireless carrier system that can be implemented using various data processing equipment, communication towers, etc. Alternatively, or in addition, the wireless carrier system may rely on satellite technology to exchange information with the client device 130.

Server system 110 may be set up by an entity such as a company or a public sector organization to provide one or more services (such as various types of cloud-based computing or storage) accessible via the Internet and/or other networks to client device 130. Server system 110 may include numerous data centers hosting various resource pools, such as collections of physical and/or virtualized computer servers, storage devices, networking equipment and the like, needed to implement and distribute the infrastructure and services offered by the server system 110, including to provide multi- and single-tenant services. In some embodiments, server system 110 may implement contact workflow engines 118-A, 118-B, a workflow engine manager 115, and associated services, provide other computing resources or services, such as a virtual compute service and storage services, such as object storage services, block-based storage services, data warehouse storage service, archive storage service, data store 150, and/or any other type of network based services (which may include various other types of storage, processing, analysis, communication, event handling, visualization, and security services, such as a code execution service that executes code without client management of the execution resources and environment). Client device 130 may access these various services offered by server system 110 via network 120, for example through an application programing interface (API) or a command line interface (CLI). Likewise network-based services may themselves communicate and/or make use of one another to provide different services.

Server system 110 may include contact workflow engines 118-A, 118-B that can provide various contact workflow channels for a customer "contact" to use to interact with the services provided by server 110. In various embodiments, a workflow channel can provide access to a contact workflow. For example, in some implementations, contact workflow engine 118-A, 118-B may be an interactive voice response (IVR) workflow engine (for interactive voice/telephonic communication), a mobile application workflow engine, a web application workflow engine, or the like. Alternatively, a contact workflow engine 118 may facilitate access to a contact workflow for providing interaction with a customer contact using other communication channels such as interactive chat, Short Message Service (SMS)/text messaging, email, a telephone conversation with an in-person representative, or the like. In embodiments, a customer contact may interact with one or more of the contact workflow engines 118-A, 118-B from client device 130. In some implementations, a contact workflow engine 118 may facilitate interactions with a customer contact by way of instruction blocks that are executed by the workflow engine that send and receive information to and from the contact.

In some implementations, a contact workflow executed by a contact workflow engine 118 may be made up of multiple instruction blocks, where each instruction block may include a prompt (e.g., an audio voice recording prompt) to be provided to a caller, as well as one or more commands to be executed based on the response provided by the caller to the prompt. In some implementations, the instruction block may not include a prompt, but may include commands and/or instructions that can be executed based on data collected during previously executed instruction blocks or other environmental parameters rather than in response to a prompt. In some workflows, a command may initiate another instruction block within the contact workflow.

For example, a customer contact may use a mobile telephone device to interact with an IVR workflow engine, where the IVR workflow engine includes instruction blocks that provide audio prompts to the client device 130 and receives voice and/or telephonic keypad input responses from the client device 130. In another example, the customer contact may use client device 130 to interact with a mobile application workflow engine that includes instruction blocks that provide a graphical user interface to client device 130 to process the contact interactions. In another example, the customer contact may use client device 130 to interact with a web application workflow engine that includes instruction blocks to process the contact interactions via a web application executing within a browser.

Server system 110 may also include a workflow engine manager 115 which can provide a context aware framework to facilitate management of customer contact interactions across all channels (e.g., all contact workflow engines 118) supported by server system 110. In various embodiments, workflow engine manager 115 can receive event context data from the instruction blocks executed by contact workflow engines 118, storing the event context data in data store 150 (e.g., event data 152) for later use by the same contact workflow engine 118 or other contact workflow channels. Thus, workflow engine manager 115 may store the most recent interaction "touch-points" of a customer contact so they may be used to customize subsequent contact workflow interactions for the customer contact. Workflow engine manager 115 may facilitate this by exposing application program interfaces (APIs) to the contact workflow engines 118 to receive data from and send data to various instruction blocks within a contact workflow.

In some implementations, the stored interactions may be used to resume an abnormally terminated contact workflow at or near the point of failure without subjecting the customer contact to restarting the workflow from the workflow entry point. In other implementations, if a contact workflow abnormally terminates before successful completion of a particular instruction block within the workflow, and the customer contact attempts to access a second contact workflow channel (e.g., a different contact workflow engine 118), workflow engine manager 115 may use the stored interaction events captured just prior to the abnormal termination to identify an instruction block within the workflow of the second channel that provides a similar function to that of the failed workflow. For example, if a customer contact utilizes an IVR to execute a purchase order transaction and the IVR workflow does not complete the cancel operation successfully, if the customer contact accesses a second workflow channel (e.g., a web application, a mobile application, a live-service channel, etc.) to attempt to cancel the purchase order, workflow engine manager 115 may use the recent interaction event data to determine an instruction block (e.g., web page, application component, agent call queue, etc.) in the second workflow channel that provides a similar function to the failed instruction block.

Server system 110 may provide workflow engine manager 115 with access to data store 150 that stores event data 152, and contact identifier attributes 154. Event data 152 may include data for previously captured interactions between a contact and a contact workflow. For example, for IVR workflows, event data 152 may include response data for recorded/captured interactions between callers and an IVR workflow that is accessible to a caller by the use of a telephone number. Similarly, for chat workflows, event data 152 may include online chat correspondence between a customer contact and the chat workflow. Further, for application workflows, event data 152 may include data received by the application from the contact along with information that identifies the program block and/or web page address that collected the data. The event data 152 may include a unique identifier associated with the contact (e.g., a phone number for the contact, a userid for the contact, an authentication token for the contact, etc.), a version number/identifier for the workflow, an identifier for each of the instruction blocks in the workflow, an identifier for each of the prompts (for an IVR) that were played for a caller, the response provided by the contact to each prompt, a listing of the order of the prompts encountered by a contact (e.g., the workflow path of a caller), or other similar information.

Contact identifier attributes 154 may store data associated with the customer contact that can additionally be used to customize a contact workflow executed by one of the contact workflow engines 118. For example, if a customer contact is associated with a premium service, the contact identifier attributes 154 may store this association and provide it to a contact workflow engine 118 to personalize the contact workflow provided. In the case of an IVR workflow, upon determining that the contact identifier attribute 154 for a contact identifier indicates that the customer contact has a premium service account, the IVR may direct the workflow to invoke an instruction block that places the customer call into a premium service agent call queue.

In an illustrative example, workflow engine manager 115 may receive requests from a contact workflow engine 118 to store event data associated with execution of instruction blocks of a contact workflow for a contact (e.g., caller, user, customer, etc.), and subsequently store the event data in event data 152. In some implementations, workflow engine manager 115 may detect that the workflow engine 118 failed to execute an instruction block of the contact workflow for the contact, and subsequently store event data to identify the failed instruction block and indicate that it failed to execute successfully.

Subsequently, workflow engine manager 115 may receive another request from the contact workflow engine 118 to provide a starting instruction block to be invoked to restart execution of the contact workflow for the contact. In some implementations, this can occur when a contact encounters a failure during execution of a contact workflow, then attempts to restart the contact workflow using the same contact workflow channel. For example, if a user attempts to cancel a purchase order using an IVR workflow and the cancelation process fails to complete successfully, the user may attempt to restart the IVR workflow to retry the cancelation process. The workflow engine 118 may send a request through the API provided by the workflow engine manager 115 framework to obtain the execution block within the IVR workflow that can complete the cancelation process without subjecting the user to restarting the IVR workflow from the beginning.

Workflow engine manager 115 may access event data 152 to identify a sequence of instruction blocks invoked by contact workflow engine 118 for the contact during a previous interaction with the contact workflow. Using this data, workflow engine manager 115 may then determine the starting instruction block to be invoked for the contact within the contact workflow. As noted above, in some implementations, workflow engine manager 115 may bypass those instruction blocks that were executed successfully during the previous interaction and select an instruction block that failed to execute successfully during the previous interaction as the starting instruction block for the new interaction. Workflow engine manager 115 may then send a notification to the workflow engine 118 to cause workflow engine 118 to restart execution of the workflow at the starting execution block.

In another embodiment, workflow engine manager 115 may receive a request from a contact workflow engine 118-A to provide a starting execution block to be invoked to begin execution of a contact workflow using data captured during a previous interaction with a contact workflow executed by contact workflow engine 118-B. For example, if a user attempts to cancel a purchase order using an IVR workflow and the cancelation process fails to complete successfully, the user may attempt to access a web application to retry the cancellation process.

Workflow engine manager 115 may access event data 152 and retrieve a sequence of instruction blocks invoked during the previous interaction with contact workflow engine 118-B. Subsequently, workflow engine manager 115 may determine that the sequence of instruction blocks included an instruction block that failed to successfully execute during the previous interaction. Workflow engine manager 115 may determine an instruction block for the workflow of contact workflow engine 118-A that provides a similar functionality to the failed instruction block of the previous interaction and select that instruction block as the starting point for contact workflow engine 118-A. The workflow engine manager 115 is described in further detail below with respect to FIG. 2.

Figure 2:
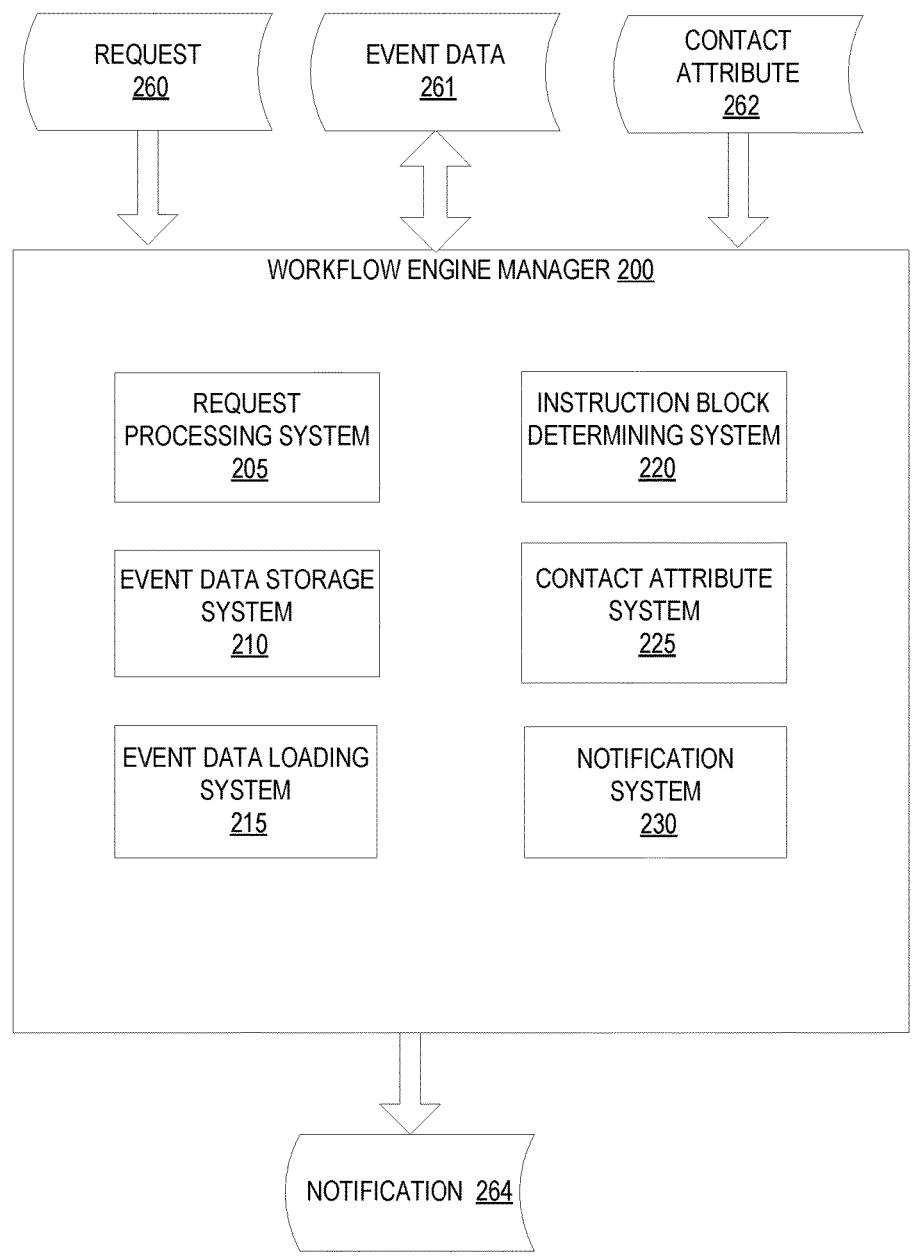
FIG. 2 is a block diagram of a logical view of an interactive contact run-time engine, in accordance with one embodiment.

FIG. 2 is a block diagram of a logical view of a workflow engine manager 200, in accordance with one embodiment. Workflow engine manager 200 may correspond to the workflow engine manager 115 of FIG. 1. In some embodiments workflow engine manager 200 may include request processor 205, event data storage system 210, event data loading system 215, instruction block determining system 220, contact attribute system 225, and notification system 230. In various embodiments, workflow engine manager 200 may provide a context aware framework to facilitate management of customer contact interactions across all channels. For example, workflow engine manager 200 may customize execution of contact workflows, as well as restart contact workflows to recover from previous execution failures using stored data for previous interactions.

Request processing system 205 can receive a request (e.g., request 260) from a contact workflow engine (e.g., contact workflow engine 118 of FIG. 1) to store event data (e.g., event data 261) associated with the execution of an instruction block of a contact workflow for a contact (e.g., user, IVR caller, customer, etc.). In some implementations, the contact is associated with a contact identifier (e.g., userid, phone number, customer identifier, authentication credential, etc.).

As noted above, a contact workflow can include multiple instruction blocks, where an instruction block may include an audio prompt and a command to execute a second instruction block based the value of a response to the audio prompt. Alternatively, an instruction block may include commands to be executed based on information associated with the execution of the workflow without an associated prompt. For example, an instruction block may include a command to execute another instruction block based on the value of a data element received by a previously executed instruction block (e.g., and account number, social security number, or other similar stored parameter), based on an environmental setting (e.g., a date/timestamp, elapsed time, etc.), or the like.

In some implementations the event data may include an execution state of the instruction block for the contact identifier. For example, the execution state may include an identifier for the instruction block, an identifier for a prompt provided by the instruction block, data provided by the contact in response to a prompt, a command executed by the instruction block based on the contact's response, or the like. In some implementations execution state of the instruction block may also include an indicator that specifies whether the instruction block executed successfully (e.g., a status indicator, return code, or the like).

Subsequently, event data storage system 210 may be invoked to store the event data in a data store (e.g., data store 150 of FIG. 1). In some implementations, event data storage system 210 may store the event data for the instruction block associated with the contact identifier for the contact. Thus, the event data for a particular contact may be obtained using the contact identifier of the contact.

In some implementations, workflow engine manager 200 may detect that a contact workflow engine failed to execute an instruction block of the contact workflow. As noted above, one instruction block may issue a command to invoke another instruction block based on input provided by the contact (user, caller, etc.). In some implementations, one instruction block may successfully invoke the command to execute the second instruction block, however the second instruction block may fail to execute successfully. This can occur due to a connectivity outage, an abnormal termination of the second instruction block, lack of computing resources to complete execution of the instruction block, etc. In some implementations, workflow engine manager 200 may detect the failure by receiving a notification from the contact workflow engine that is in control of executing instruction blocks of the contact workflow. The notification may be received via an API for the workflow engine manager 200 that is exposed to the contact workflow engine as part of the context aware framework noted as noted above. Alternatively, workflow engine manger 200 may include a monitor process that monitors the status of active workflows to detect failures.

If a failure has been detected, event data storage system 210 may be invoked to store event data associated with the contact identifier and indicating that the instruction block failed to execute successfully. As described above, the event data may include information to identify the failed instruction block such as the instruction block's unique identifier.

Subsequently, request processing system 205 may receive a request to provide a starting instruction block to be invoked to restart the contact workflow for the contact. This may occur if a user attempts to conduct a transaction using a particular workflow channel, the transaction fails to complete successfully, and the user attempts to retry the transaction using the same workflow channel. For example, if an IVR caller attempts to cancel a purchase order using an IVR workflow, and the cancelation process fails to complete successfully (e.g., the purchase order was not successfully canceled), the IVR caller may attempt to initiate the IVR a second time to retry the cancellation process.

Workflow engine manager 200 may invoke event data loading system 215 to retrieve a set of stored event data associated with the contact identifier for the contact. In one embodiment, event data loading system 215 may query the data store using the contact identifier to retrieve the event data for any recent interaction with the workflow (e.g., instruction block identifiers, whether the instruction blocks executed successfully, or other similar information. Workflow engine manager 200 may subsequently invoke instruction block determining system 220 to analyze the retrieved data for the previous interactions to determine a starting instruction block to be invoked to restart the contact workflow for the contact.

In some implementations, instruction block determining system 220 may group previous interactions for the particular contact workflow by time such that the most recent interaction events are grouped together. Instruction block determining system 220 may then examine the most recent interactions to determine whether there were any recent points of failure during a previous execution of the contact workflow that the user may wish to retry. Instruction block determining system 220 may determine, using the retrieved event data, that a first instruction block completed execution successfully. Instruction block determining system 220 may examine the execution state of the first instruction block that includes a command issued by that instruction block to invoke a second instruction block. Instruction block determining system 220 may then determine that the event data for the second instruction block indicates that the second instruction block failed to execute successfully.

In one embodiment, instruction block determining system 220 may select the second instruction block as the starting instruction block to be used when restarting the contact workflow. Notification system 230 may then be invoked to send a notification (e.g., notification 264) to the contact workflow engine to cause the contact workflow engine to resume execution of the contact workflow for the contact at the selected starting instruction block. In some implementations, notification system 230 may select a portion of the execution state for the first instruction block to be used by the second instruction block so that it may restart within the workflow as if the contact had started the workflow from the very beginning (e.g., the workflow's entry point). In some implementations, the portion of the execution state may include at least one of the contact identifier, an authentication token for the contact identifier, or an environmental variable for the contact workflow set by the first instruction block during the previous interaction. Notification system 230 may then generate the notification that includes a command to execute the second instruction block as well as the portion of the execution state for the first execution block.

In another embodiment, instruction block determining system 220 may select an instruction block based on an attribute associated with the contact identifier for the contact (e.g., contact attribute 262). Instruction block determining system 220 may invoke contact attribute system 225 to determine that contact attribute 262 indicates that confirmation is to be requested from the contact within the workflow before invoking the second instruction block. In such cases, an additional instruction block may be selected as the starting instruction block, where the additional instruction block invokes a command to request confirmation to invoke the second instruction block. For example, continuing the cancel order example described above, if the IVR caller restarts the IVR to retry the order cancelation process, and the IVR caller's user profile is configured to request confirmation before restarting the IVR workflow, instruction block determining system 220 may select an instruction block that presents a prompt to the IVR caller such as "do you wish to retry cancelling order 12345?" with an associated command to restart the instruction block that initiates the cancellation process that had previously failed to execute successfully.

In addition to facilitating an injection point into a restarted workflow, in some embodiments, workflow engine manager 200 may provide context to a contact workflow channel based on previous interactions with a different contact workflow channel for the same contact identifier. In an illustrative example, request processing system 205 may receive a request from a contact workflow engine to provide a starting instruction block to be invoked to begin execution of a contact workflow for a particular contact. For example, an IVR workflow engine may send a request to workflow engine manager 200 to provide context for a user of the IVR (e.g., a caller) to determine a starting point for the IVR workflow. In some implementations, the request may be a request to interact with the contact workflow, where the request causes request processing system 205 to begin the process of determining the starting instruction block.

In a similar process to that noted above, event data loading system 215 may be invoked to retrieve a set of stored event data for a second contact workflow for the contact. In some implementations, the set of stored event data includes a sequence of instruction blocks invoked during the previous interaction with the second contact workflow using a second contact workflow engine that was invoked. For example, event data loading system 215 may query the event data in the data store to retrieve a sequence of instruction blocks executed by a web application during an interaction with the particular contact.

Instruction block determining system 220 may be invoked to analyze the data from the previous interactions with the web application to select an entry point for the IVR. In some implementations, instruction block determining system 220 may follow a similar process to that noted above to determine, using the stored event data, that a first instruction block of the second contact workflow completed execution successfully for the contact during the previous interaction. Instruction block determining system 220 may also determine that the execution state of the first instruction block includes a command to invoke a second instruction block in the second contact workflow. In one embodiment, instruction block determining system 220 may then determine that the second instruction block for the second contact workflow failed to complete execution successfully during the previous interaction. Instruction block determining system 220 may use this contextual information to select a starting point to provide to the contact workflow engine that issued the initial request.

In some implementations, instruction block determining system 220 may examine the functionality provided by the failed instruction block in the second contact workflow. Instruction block determiner may access configuration data (e.g., metadata, configuration files, etc.) associated with the instruction block identifier to determine the functionality provided by the instruction block. Instruction block determiner 220 may then determine an instruction block in the first contact workflow that provides a similar functionality and select that instruction block as the starting point for the contact workflow engine that issued the request. Notification system 230 may then be invoked to send a notification to the requesting contact workflow engine to cause that contact workflow engine to begin execution of the contact workflow for the contact at the starting instruction block.

For example, instruction block determining system 220 may examine the recent interactions of a user with a web application and determine that the user attempted to cancel purchase order using the web application, but that the final step of the cancelation process failed to execute successfully. Instruction block determining system 220 may identify an instruction block within the IVR workflow that provides similar functionality (e.g., cancel a particular purchase order) and invoke the instruction block to cancel that order. In some implementations, notification system 230 may send the identifier associated with the applicable IVR instruction block to be invoked to cancel the order as well as the contact identifier (e.g., userid, phone number, or other identification information associated with the user) as well as any identification information related to the order to be canceled.

In some implementations, instruction block determining system 220 may additionally invoke contact attribute system 225 to use contact attribute 262 for determining a starting execution block for the request. In an illustrative example, the contact attribute 262 for the contact identifier may indicate a preferred status level for the account. For example, to continue the IVR example described above, the contact attribute 262 may indicate that any calls made by the IVR caller are to be routed to a particular IVR call queue. Instruction block determining system 220 may determine an instruction block for the IVR workflow that provides access to the particular IVR call queue, and select that instruction block as the starting point for the IVR workflow. Additionally, when the notification is sent to the contact workflow engine, notification system 230 may additionally provide at least a portion of the sequence of instruction blocks invoked during the previous interaction with the web application workflow for display by an interface associated with the IVR call queue. For example, the console that provides the agent handling the IVR call queue may be provided with the sequence of instruction blocks invoked during the previous interaction to provide the agent with access to the context of the previous interactions to more efficiently manage call queue request (e.g., the purchase order cancelation, etc.).

Figure 3:
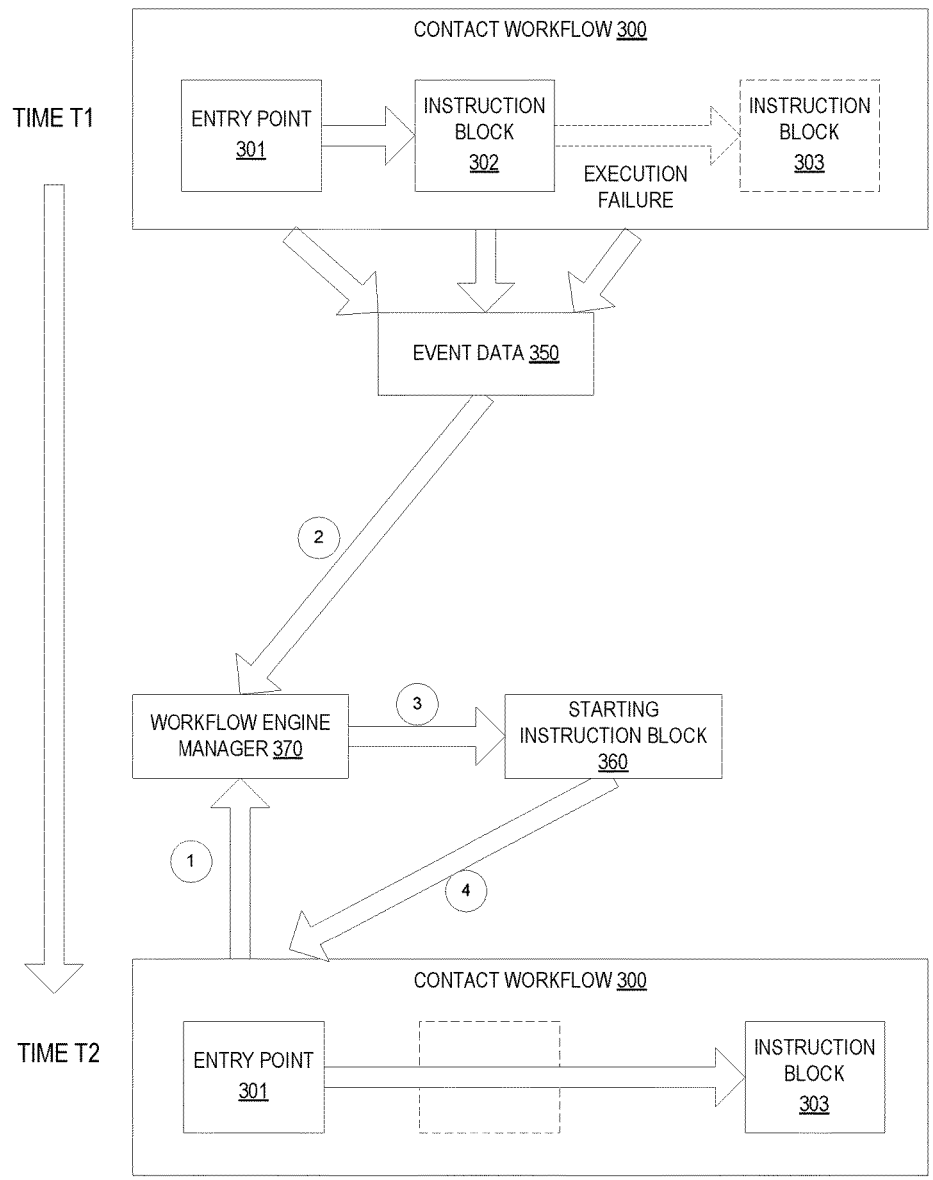
FIG. 3 illustrates an example of using contextual information to restart a contact workflow, in accordance with one embodiment.

FIG. 3 illustrates an example of using contextual information to restart a contact workflow in accordance with one aspect of the present disclosure. As shown in FIG. 3, contact workflow 300 includes at least three instruction blocks (301, 302, and 303). At Time T1, contact workflow 300 is invoked, executing entry point 301, and instruction block 302. At each instruction block, event data associated with the applicable instruction block is stored in event data 350. Instruction block 302 invokes instruction block 303, and subsequently instruction block 303 experiences an execution failure. A corresponding event is stored in event data 350 to indicate that instruction block 303 failed to execute successfully.

At Time T2, contact workflow 300 is restarted (e.g., by the user, customer, IVR caller, etc.) at entry point 301. The contact workflow engine for contact workflow 300 sends a request to the workflow engine manager 370 (step 1) as described above with respect to the workflow engine manager 115 of FIG. 1, and/or workflow engine manager 200 of FIG. 2 to provide a starting instruction block 360 for restarting contact workflow 300. Workflow engine manager 370 obtains event data 350 for the previous interaction (step 2) and determines the starting instruction block 360 using the event data 350 (step 3). Workflow engine manager 370 then sends a notification to contact workflow 300 that includes the starting instruction block 360 (step 4). As shown in FIG. 3, the starting instruction block 360 is set to the instruction block that failed during the previous interaction at Time T1. Thus, starting instruction block 360 is set to instruction block 303. As shown in FIG. 3, in some implementations, instruction block 302 may be bypassed at Time T2 to restart workflow 300 at instruction block 303.

In some implementations, at Time T2, workflow engine manager 370 may consider additional contextual indicators stored in event data 350 when determining starting instruction block 360 (step 3). For example, workflow engine manager 370 may analyze the amount of elapsed time since the same user (customer, IVR caller, etc.) has interacted with contact workflow 300 when determining starting instruction block 360. Thus, if the elapsed time between Time T1 and Time T2 is relatively short (e.g., seconds, minutes, hours, etc.), this could indicate that the interaction at Time T2 is related to the interaction at Time T1 (e.g., a user has called right back about the previous interaction). Accordingly, workflow engine manager 370 may determine that starting instruction block 360 should re-inject the user into workflow 300 where the user left off at Time T1. If, however, the elapsed time between Time T1 and Time T2 is relatively long (e.g., days, weeks, months, etc.), this could indicate that the interaction at Time T2 is not related to the interaction at Time T1 (e.g., a user has initiated an interaction that is unrelated to the previous interaction). Accordingly, workflow engine manager 370 may determine that starting instruction block 360 should inject the user into workflow 300 at entry point 301.

Similarly, workflow engine manager 370 may consider other context indicators when determining starting instruction block 360. For example, workflow engine manager 370 may consider the type device a contact has used to initiate the workflow 300 at Time T1 compared to the type of device used to initiate the workflow 300 at Time T2. Other context indicators may include the location of the user at Time T1 compared to Time T2, the actions taken by a contact within workflow 300 at Time T1 (e.g., what a user has just ordered from a website at Time T1), or other similar types of information. In such cases, the additional context indicators can be used by workflow engine manager 370 to determine whether workflow 300 is restarted at Time T2 as opposed to resumed in relation to activity at Time T1.

Figure 4:
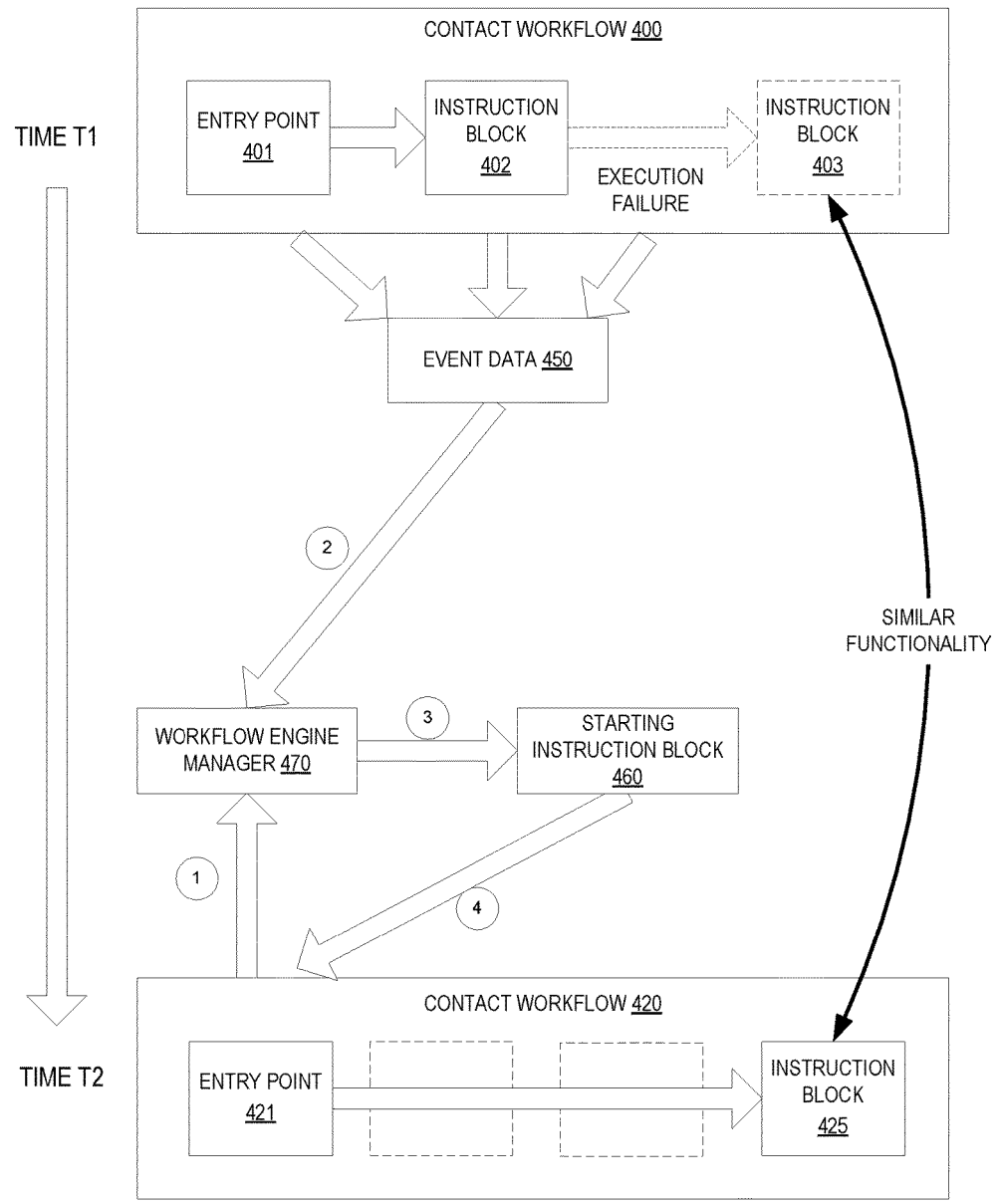
FIG. 4 illustrates an example of using contextual information of a previous interaction with one contact workflow to start a different contact workflow, in accordance with one embodiment.

FIG. 4 illustrates an example of using contextual information of a previous interaction with one contact workflow to start a different contact workflow in accordance with one aspect of the present disclosure. As shown in FIG. 4, contact workflow 400 includes at least three instruction blocks (401, 402, and 403). At Time T1, contact workflow 400 is invoked, executing entry point 401, and instruction block 402. At each instruction block, event data associated with the applicable instruction block is stored in event data 450. Instruction block 402 invokes instruction block 403, and subsequently instruction block 403 experiences an execution failure. A corresponding event is stored in event data 450 to indicate that instruction block 403 failed to execute successfully.

At Time T2, a different contact workflow 420 is initiated (e.g., by the user, customer, IVR caller, etc.) at entry point 401. As noted above, contact workflow 420 may be for an entirely different contact workflow channel than that of contact workflow 400. For example, contact workflow 400 may be provided by a web application channel and contact workflow 420 may be provided by an IVR channel. Alternatively, contact workflow 420 may be a different contact workflow within the same workflow channel as that of contact workflow 400. The contact workflow engine for contact workflow 420 sends a request to the workflow engine manager 470 (step 1) as described above with respect to the workflow engine manager 115 of FIG. 1, and/or workflow engine manager 200 of FIG. 2 to provide a starting instruction block 460 for starting contact workflow 420. Workflow engine manager 470 obtains event data 450 for the previous interaction (step 2) and determines the starting instruction block 460 using the event data 450 (step 3). Workflow engine manager 470 then sends a notification to contact workflow 420 that includes the starting instruction block 460 (step 4).

As shown in FIG. 4, the workflow engine manager 470 determines that instruction block 403 failed to execute successfully. The workflow engine manager 470 additionally determines that instruction block 403 of contact workflow 400 provides similar functionality to that of instruction block 425 in contact workflow 420. Starting instruction block 460 is set to the instruction block in contact workflow 420 that provides similar functionality to that of the instruction block that failed during the previous interaction at Time T1. Thus, starting instruction block 360 is set to instruction block 425. As shown in FIG. 4, in some implementations, any intervening instruction blocks in contact workflow 420 may be bypassed at Time T2 to start workflow 420 at instruction block 425.

Figure 5:
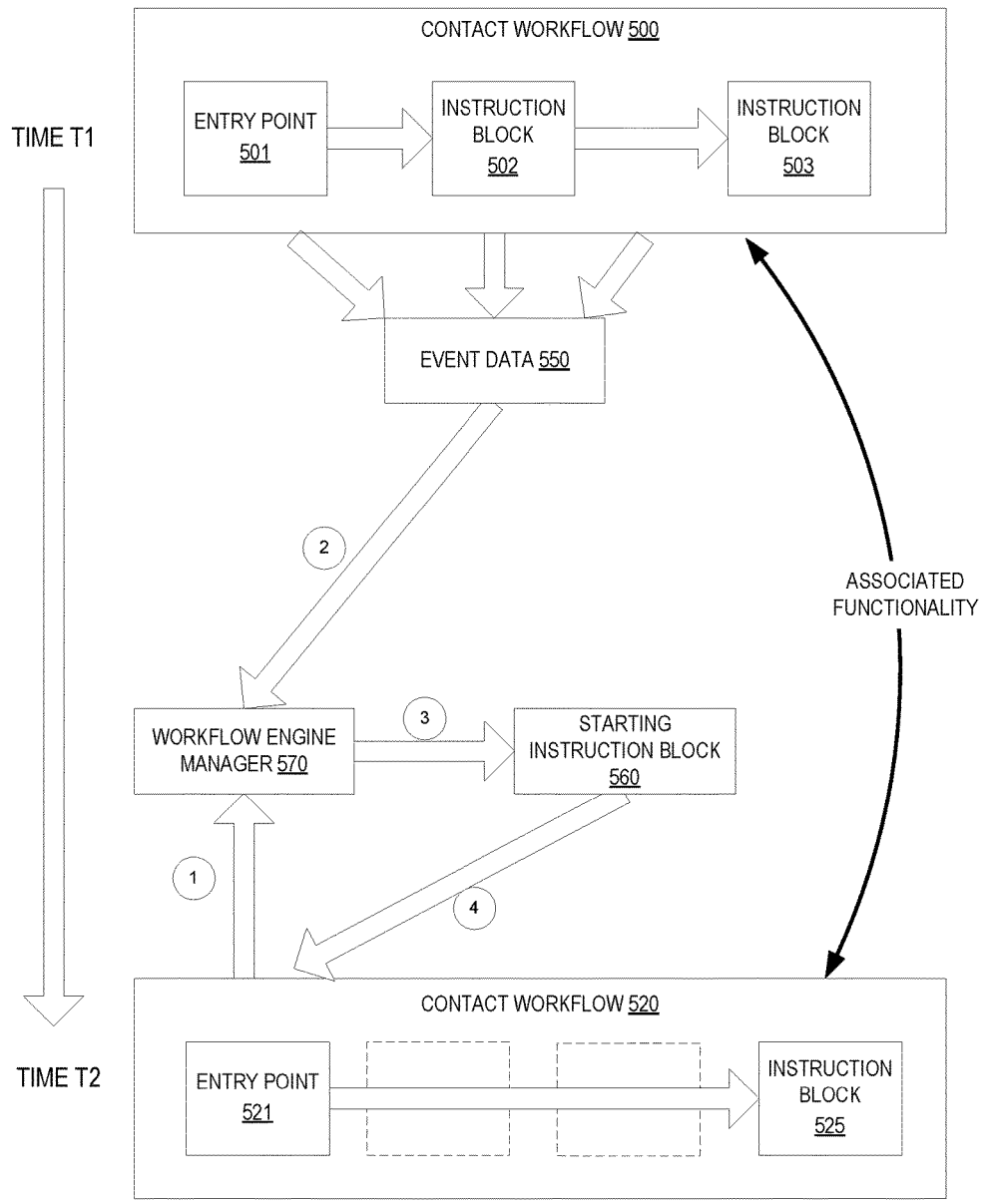
FIG. 5 illustrates another example of using contextual information of a previous interaction with one contact workflow to start a different contact workflow, in accordance with one embodiment.

FIG. 5 illustrates another example of using contextual information of a previous interaction with one contact workflow to start a different contact workflow in accordance with one aspect of the present disclosure. As shown in FIG. 5, contact workflow 500 includes at least three instruction blocks (501, 502, and 503). At Time T1, contact workflow 500 is invoked, executing entry point 501, instruction block 502, and instruction block 503. At each instruction block, event data associated with the applicable instruction block is stored in event data 550. As shown in FIG. 5, contact workflow 500 completes successfully.

At Time T2, a contact workflow 520 is initiated (e.g., by the user, customer, IVR caller, etc.) at entry point 501. As noted above, contact workflow 520 may be for an entirely different contact workflow channel than that of contact workflow 500. For example, contact workflow 500 may be provided by a web application channel and contact workflow 520 may be provided by an IVR channel. Alternatively, contact workflow 520 may be a different contact workflow within the same workflow channel as that of contact workflow 500. In other embodiments, contact workflow 520 may be the same workflow as contact workflow 500. The contact workflow engine for contact workflow 520 sends a request to the workflow engine manager 570 (step 1) as described above with respect to the workflow engine manager 115 of FIG. 1, and/or workflow engine manager 200 of FIG. 2 to provide a starting instruction block 560 for starting contact workflow 520. Workflow engine manager 570 obtains event data 550 for the previous interaction (step 2) and determines the starting instruction block 560 using the event data 550 (step 3). Workflow engine manager 570 then sends a notification to contact workflow 520 that includes the starting instruction block 560 (step 4).

As shown in FIG. 5, the workflow engine manager 570 determines that workflow 500 completed successfully. The workflow engine manager 570 may additionally determine that the sequence of instruction blocks in workflow 500 is associated with a particular activity or category of activity. Workflow engine manager 570 may then determine an instruction block in contact workflow 520 that is associated with either the particular activity or category of activity. For example, workflow engine manager 570 may determine that the sequence of instruction blocks is associated with a transaction involving a return of a previously purchased item. Upon making this determination, workflow engine manager 470 may determine an instruction block in workflow 520 that is associated with the return transaction. Workflow engine manager 570 may select an instruction block within workflow 520 that executes a transaction status function so the caller may obtain the status of the return transaction. Workflow engine manager 570 may make this determination using stored metadata associated with each workflow in the system, a mapping table, a set of rules associating contact workflows with contact identifiers, a set of rules associating activities with workflows, or the like.

In some implementations, starting instruction block 560 may be a particular instruction block of contact workflow 520 (e.g., instruction block 525). In such cases any intervening instruction blocks in contact workflow 520 may be bypassed at Time T2 to start workflow 520 at that particular instruction block (e.g., instruction block 525). In some implementations, workflow manager 570 may determine that that another workflow within the system provides an associated functionality to the sequence of instruction blocks in contact workflow 500 and send a notification to contact workflow 520 to transfer control to that workflow. In other implementations, workflow manager 570 may determine that that another workflow channel within the system includes a workflow provides an associated functionality to the sequence of instruction blocks in contact workflow 500 and send a notification to contact workflow 520 to transfer control to that workflow channel. For example, if contact workflow 520 executes for a mobile application, workflow manager 570 may send a notification to the mobile application to launch a messaging application to communicate directly with a live agent or chat bot.

Figure 6:
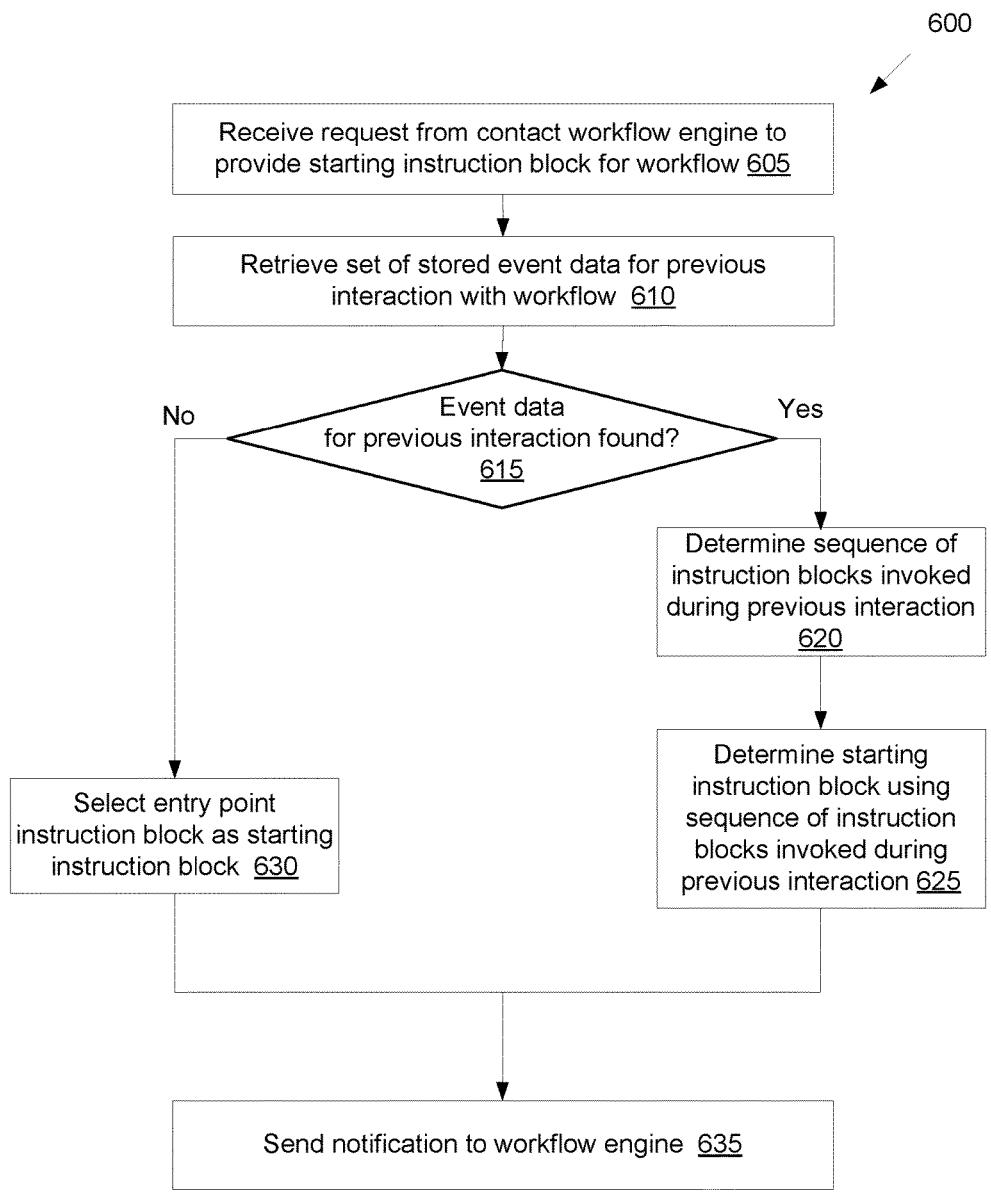
FIG. 6 is a flow diagram of an embodiment for a method of using contextual information to restart a contact workflow, in accordance with one embodiment.
Figure 7:
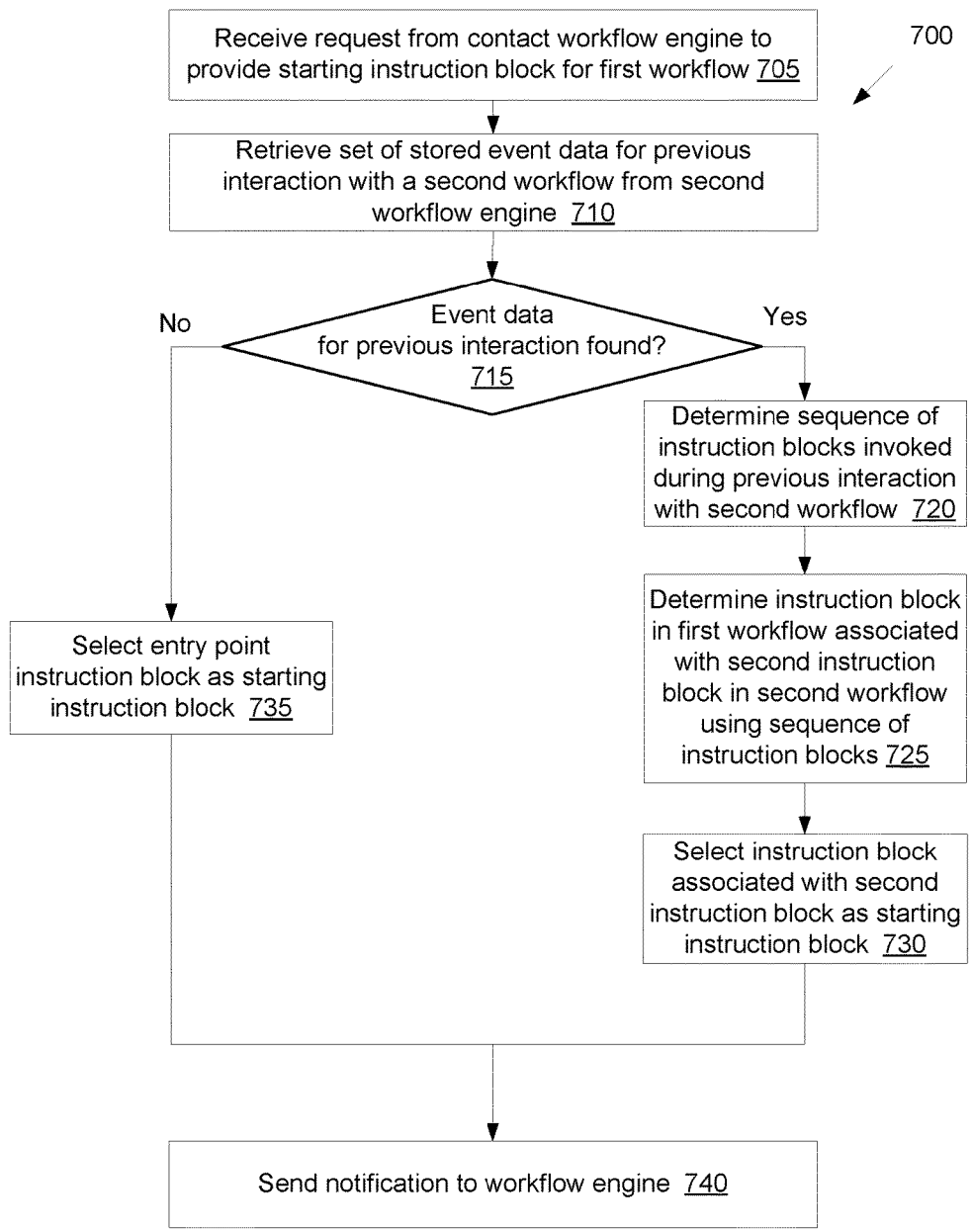
FIG. 7 is a flow diagram of an embodiment for a method of using contextual information of a previous interaction with one contact workflow to start a different contact workflow, in accordance with one embodiment.

FIGS. 6-7 are flow diagrams of various embodiments of methods performed by a workflow engine manager. The methods are performed by processing logic that may include hardware (circuitry, dedicated logic, etc.), software (such as is run on a general purpose computer system or a dedicated machine), firmware, or some combination thereof. In one implementation, the methods may be performed by workflow engine manager 115 of FIG. 1, and/or workflow engine manager 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 6 is a flow diagram of an embodiment for a method 600 of using contextual information to restart a contact workflow. At block 605 of method 600, processing logic receives a request from a contact workflow engine to provide a starting instruction block to be invoked to restart a workflow for a contact. In some implementations, the contact is associated with a contact identifier. In some implementations, the contact workflow includes a plurality of instruction blocks. At block 610, processing logic retrieves a set of stored event data for the contact workflow associated with the contact identifier for a previous interaction with the workflow. In some implementations, processing logic may retrieve the stored event data for the same contact workflow that issued the request in block 605. Alternatively, processing logic may retrieve the stored event data for a previous interaction with a different workflow associated with the contact identifier.

At block 615, processing logic branches based on whether event data for a previous interaction with the workflow has been found for the contact identifier. If so, processing logic continues to block 620. At block 620, processing logic determines a sequence of instruction blocks invoked during the previous interaction with the contact workflow for the contact. At block 625, processing logic determines a starting instruction block using the sequence of instruction blocks retrieved at block 610. In one embodiment, processing logic may make this determination by first determining that a first instruction block in the sequence of instruction blocks completed successfully for the previous interaction. Processing logic may then determine that an execution state of the first instruction block includes a command issued by the first instruction block to invoke a second instruction block during the previous interaction. Processing logic may then determine that the second instruction block failed to complete execution successfully for the contact during the previous interaction, and subsequently select the second instruction block as the starting instruction block.

In another embodiment, processing logic may determine the starting instruction block by determining that the sequence of instruction blocks is associated with at least one of a particular activity or category of activities. Processing logic may make this determination by examining the actions executed by the sequence of instruction blocks, by analyzing the identifiers associated with the instruction blocks and matching them to a known activity category, or the like. For example, processing logic may determine that the sequence of instruction blocks is associated with a transaction involving a return of a previously purchased item. Upon making this determination, processing logic may determine an instruction block in the workflow that is associated with the return transaction. Processing logic may then select an instruction block within the workflow that executes a transaction status function so the caller may obtain the status of the return transaction. In some implementations, processing logic may identify an instruction block within the same workflow. In some implementations, processing logic may identify an instruction block within another workflow within the same workflow channel. In some implementations, processing logic may identify an instruction block within a different workflow of a different workflow channel (e.g., a different contact workflow engine than that submitting the request received at block 605.

In another embodiment, processing logic may determine the starting instruction block by analyzing additional contextual indicators associated with the sequence of instruction blocks. For example, processing logic may analyze the amount of elapsed time since the same user (customer, IVR caller, etc.) has interacted with the same contact workflow. Similarly, processing logic may consider the type of device a contact has used to initiate the contact workflow during the previous interaction compared to the type of device used to restart the workflow, the location of the user during the previous interaction compared to the location of the user when restarting the workflow, or other similar contextual information.

If, at block 615, processing logic is unable to retrieve event data for any previous interaction (e.g., no previous interactions were found for that contact identifier), processing proceeds to block 630. At block 630, processing logic selects the entry point of the currently selected contact workflow as the starting instruction block. In other words, the contact workflow should execute from its normal starting point.

At block 635, processing logic sends a notification to the workflow engine to cause the workflow engine to restart execution of the workflow for the contact at the starting execution block. In some implementations, processing logic selects a portion of the execution state for a previously executed instruction block to be used by the starting instruction block and generates the notification to include the portion of the execution state of the previously executed instruction block and the command to execute the starting instruction block. After block 635, the method of FIG. 6 terminates.

FIG. 7 is a flow diagram of an embodiment for a method 700 of using contextual information for a previous interaction with one contact workflow to start a different contact workflow. At block 705 of method 700, processing logic receives a request from a first contact workflow engine to provide a starting instruction block to be invoked to begin execution of a first contact workflow for a contact. In some implementations, the contact is associated with a contact identifier. In some implementations, the first contact workflow includes a plurality of instruction blocks. At block 710, processing logic retrieves a set of stored event data for a second contact workflow associated with the contact identifier. In some implementations, the second contact workflow uses a second contact workflow engine, and the stored event data is associated with the contact identifier for a previous interaction with the second contact workflow.

At block 715, processing logic branches based on whether event data for a previous interaction with the second contact workflow from the second workflow engine has been found for the contact identifier. If so, processing logic continues to block 720. At block 720, processing logic determines a sequence of instruction blocks invoked during the previous interaction with the second contact workflow for the contact. At block 725, processing logic uses the sequence of instruction blocks from block 720 to determine an instruction block in the first contact workflow that is associated with an instruction block in the second workflow of the second workflow engine. In some implementations, processing logic may determine an associated instruction block by identifying an instruction block in the first contact workflow that provides an operation that is similar to the function provided by the instruction block in the second contact workflow in the sequence of instruction blocks.

In one embodiment, processing logic may make this determination by first determining that a first instruction block in the sequence of instruction blocks completed successfully for the previous interaction. Processing logic may then determine that an execution state of the first instruction block includes a command issued by the first instruction block to invoke a second instruction block during the previous interaction. Processing logic may then determine that the second instruction block failed to complete execution successfully for the contact during the previous interaction. Processing logic may then determine an instruction block in the first contact workflow that provides a similar functionality to the second instruction block in the second contact workflow.

At block 730, processing logic selects the instruction block identified at block 725 as the starting instruction block. In one embodiment, following the embodiment described for step 725, processing logic may select the instruction block in the first contact workflow that provides the similar functionality to be the starting instruction block.

If, at block 715, processing logic is unable to retrieve event data for any previous interaction (e.g., no previous interactions were found for that contact identifier), processing proceeds to block 735. At block 735, processing logic selects the entry point of the currently selected contact workflow as the starting instruction block. In other words, the first contact workflow should execute from its normal starting point.

At block 740, processing logic sends a notification to the first workflow engine to cause the first workflow engine to begin execution of the contact workflow for the contact at the starting execution block selected at block 730 or block 735. In some implementations, processing logic selects a portion of the execution state for the selected instruction block from the previous interaction (identified at block 725) to be used by the starting instruction block in the second workflow and generates the notification to include the portion of the execution state of the first instruction block and the command to execute the second instruction block. After block 740, the method of FIG. 7 terminates.

Figure 8:
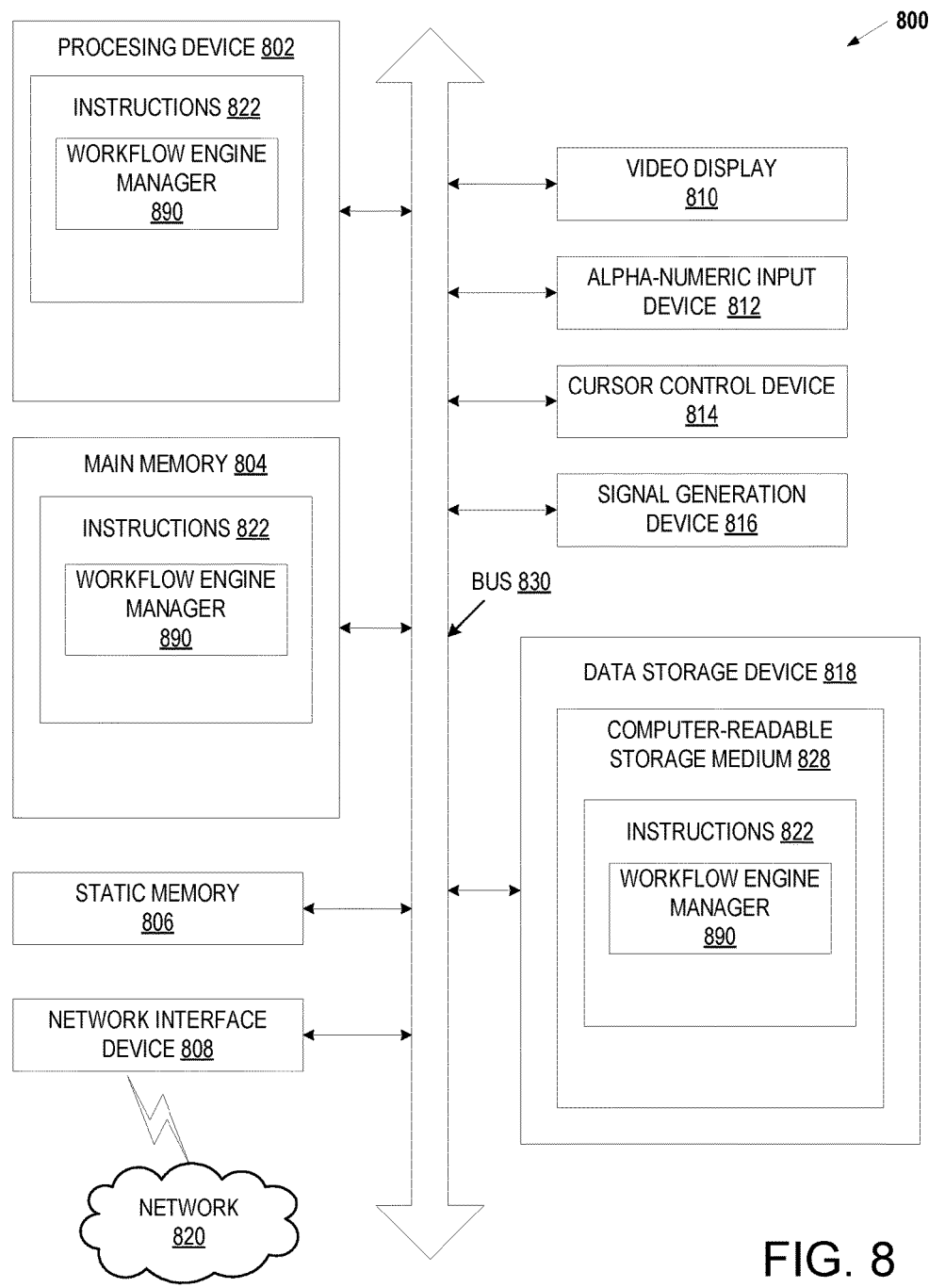
FIG. 8 is a block diagram illustrating a server computing device with a contact run-time engine, in accordance with one embodiment.

FIG. 8 is a block diagram illustrating a server computing device 800 with a contact run-time engine, in accordance with one embodiment. The server computing device 800 may be connected (e.g., networked) to other machines in a LAN, an intranet, an extranet, and/or the Internet. The server computing device 800 may be a personal computer (PC), a tablet PC, a set-top box (STB), a web appliance, a rack-mount server, a network router, a switch or bridge, or any machine capable of executing a set of instructions (sequential or otherwise) that specify actions to be taken by that machine. Further, while a single machine is illustrated, the server computing device 800 shall also be taken to include any collection of machines that individually or jointly execute a set (or multiple sets) of instructions to perform any one or more of the methodologies discussed herein. For example, the server computing device 800 may be one or more devices in a server system. In one embodiment, the server computing device 800 is one node of a cluster that provides a cloud service such as Amazon's® elastic compute cloud (EC2®), Amazon web services (AWS®), or other cloud service.

The server computing device 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage component 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The server computing device 800 may further include a network interface device 808. The server computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and/or a signal generation device 816 (e.g., a speaker).

The data storage component 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the server computing device 800, the main memory 804 and the processing device 802 also constituting machine-readable storage media.

In one implementation, the instructions 822 include instructions for a workflow engine manager 890 (e.g., workflow engine manager 115 of FIG. 1, and/or workflow engine manager 200 of FIG. 2) and/or a software library containing methods that call modules in a contact run-time engine (e.g., corresponding to the methods of FIGS. 6-7, etc.). While the machine-readable storage medium 828 is shown in an example implementation to be a single medium, the term "machine-readable storage medium" should be taken to include a single medium or multiple media (e.g., network attached storage, a centralized or distributed database, and/or associated unsolicited content storage areas and servers) that store the one or more sets of instructions. The term "machine-readable storage medium" shall also be taken to include any medium other than a carrier wave that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "sending", "determining", "storing", "retrieving", "detecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention relate to an apparatus for performing the operations herein. This apparatus may be specially constructed for the disclosed purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The structure for a variety of these systems will appear from the description above. In addition, embodiments of the present invention are not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a first request from an interactive voice response (IVR) workflow engine, wherein the first request is to store a first event data associated with execution of a first instruction block of a contact workflow for an IVR caller, wherein the IVR caller is associated with a contact identifier, and wherein the first event data comprises an execution state of the first instruction block for the contact identifier;
    storing the first event data for the first instruction block associated with the contact identifier;
    detecting that the IVR workflow engine failed to execute a second instruction block of the contact workflow for the IVR caller, wherein the second instruction block was invoked by the first instruction block in the contact workflow;
    storing a second event data in a data store, the second event data associated with the contact identifier and indicating that the second instruction block for the contact identifier failed to execute;
    receiving a second request from the IVR workflow engine to provide a starting instruction block to be invoked to restart the contact workflow for the IVR caller;
    retrieving a set of stored event data associated with the contact identifier, the set of stored event data comprising the first event data and the second event data;
    determining, using the set of stored event data, a starting instruction block to be invoked in the contact workflow for the IVR caller; and
    sending a notification to the IVR workflow engine to cause the IVR workflow engine to execute the contact workflow for the IVR caller at the starting instruction block.

2. The method of claim 1, wherein determining the starting instruction block in the contact workflow comprises:
    determining, using the stored event data, that the first instruction block completed execution successfully for the IVR caller;
    determining, using the stored event data, that the execution state of the first instruction block comprises a command issued by the first instruction block to invoke the second instruction block;
    determining, using the stored event data, that the second instruction block failed to execute successfully for the IVR caller; and
    selecting the second instruction block as the starting instruction block.

3. The method of claim 2, further comprising:
    selecting a portion of the execution state for the first instruction block to be used by the second instruction block; and
    generating the notification, wherein the notification comprises the command to invoke the second instruction block and the portion of the execution state for the first instruction block.

4. A non-transitory computer readable storage medium, having instructions stored therein, which when executed by at least one processing device of a computer system, cause the system to:
    receive a first request to interact with a contact workflow, wherein the contact workflow comprises a starting instruction block to be invoked to start execution of the contact workflow for a contact, wherein the contact is associated with a contact identifier, and wherein the contact workflow comprises a plurality of instruction blocks;
    determine, using at least one instruction block invoked during a previous interaction for the contact or a different contact workflow for the contact, the starting instruction block of the plurality of instruction blocks to be invoked in the contact workflow for the contact; and
    send a notification to a contact workflow engine to cause the contact workflow engine to start execution of the contact workflow for the contact at the starting instruction block.

5. The non-transitory computer readable storage medium of claim 4, wherein the contact workflow engine comprises at least one of an interactive voice response (IVR) workflow engine, a mobile application workflow engine, or a web application workflow engine.

6. The non-transitory computer readable storage medium of claim 4, wherein to determine the starting instruction block, the system is to:
    retrieve stored event data for the contact workflow associated with the contact identifier, the stored event data comprising a sequence of instruction blocks invoked during the previous interaction, wherein the sequence of instruction blocks comprises the at least one instruction block.

7. The non-transitory computer readable storage medium of claim 6, wherein the system is further to:
    determine, using the stored event data, that the at least one instruction block is associated with at least one of a particular activity or a category of activity;
    determine an instruction block in the contact workflow associated with the at least one of the particular activity or the category of activity; and
    select the instruction block as the starting instruction block.

8. The non-transitory computer readable storage medium of claim 6, wherein the system is further to:

determine, using the stored event data, that the at least one instruction block is associated with at least one of a particular activity or a category of activity;
determine an instruction block in another contact workflow of another contact workflow engine associated with the at least one of the particular activity or the category of activity; and
select the instruction block as the starting instruction block.

9. The non-transitory computer readable storage medium of claim 6, wherein the system is further to:
determine, using the stored event data, that a first instruction block completed execution successfully for the contact during the previous interaction;
determine, using the stored event data, that an execution state of the first instruction block comprises a command issued by the first instruction block to invoke a second instruction block during the previous interaction;
determine, using the stored event data, that the second instruction block failed to complete execution successfully for the contact during the previous interaction; and
select the second instruction block as the starting instruction block.

10. The non-transitory computer readable storage medium of claim 9, wherein the system is further to:
select a portion of an execution state for the first instruction block to be used by the second instruction block; and
generate the notification, wherein the notification comprises the command to invoke the starting instruction block and the portion of the execution state for the first instruction block.

11. The non-transitory computer readable storage medium of claim 10, wherein the portion of the execution state for the first instruction block comprises at least one of the contact identifier, an authentication token for the contact identifier, or an environmental variable for at least one of the contact workflow or the different contact workflow set by the first instruction block during the previous interaction.

12. The non-transitory computer readable storage medium of claim 9, wherein the system is further to:
determine that a contact attribute associated with the contact identifier indicates that a confirmation is to be requested from the contact to invoke the second instruction block; and
select a third instruction block as the starting instruction block, wherein the third instruction block comprises a first command to request the confirmation and a second command to invoke the second instruction block.

13. The non-transitory computer readable storage medium of claim 9, wherein the system is further to:
receive, during the previous interaction, a second request from the contact workflow engine to store a first event data associated with execution of the first instruction block during the previous interaction; and
store the first event data for the contact identifier.

14. The non-transitory computer readable storage medium of claim 13, wherein the system is further to:
detect, during the previous interaction, that the contact workflow engine failed to execute the second instruction block of the contact workflow for the contact, wherein the second instruction block was invoked by the first instruction block during the previous interaction; and store a second event data for the contact identifier, the second event data indicating that the second instruction block for the contact identifier failed to execute.

15. A computer system comprising:
At least one memory to store instructions; and
at least one processing device, operatively coupled to the at least one memory, to execute the instructions, wherein the system is to:
receive a first request to interact with a first contact workflow of a first contact workflow engine, wherein the first contact workflow comprises a starting instruction block to be invoked to start execution of the first contact workflow for a contact, wherein the contact is associated with a contact identifier, and wherein the first contact workflow comprises a plurality of instruction blocks;
determine, using at least one instruction block invoked during a previous interaction with at least one of the first contact workflow or a second contact workflow for the contact using a second contact workflow engine, the starting instruction block of the plurality of instruction blocks to be invoked in the first contact workflow for the contact, wherein the second contact workflow engine is different from the first contact workflow engine; and
send a notification to the first contact workflow engine to cause the first contact workflow engine to begin execution of the first contact workflow for the contact at the starting instruction block.

16. The computer system of claim 15, wherein the system is further to:
retrieve stored event data for the second contact workflow associated with the contact identifier, the stored event data comprising the at least one instruction block invoked during the previous interaction with at least one of the first contact workflow or the second contact workflow.

17. The computer system of claim 16, wherein the system is further to:
determine, using the stored event data, that a first instruction block of the at least one instruction block completed execution successfully for the contact during the previous interaction with the second contact workflow; and
determine, using the stored event data, that an execution state of the first instruction block comprises a command issued by the first instruction block to invoke a second instruction block of the at least one instruction block during the previous interaction with the second contact workflow; and
determine, using the stored event data, that the second instruction block failed to complete execution successfully for the contact during the previous interaction with the second contact workflow.

18. The computer system of claim 17, wherein the system is further to:
determine a third instruction block of the plurality of instruction blocks in the first contact workflow that is associated with the second instruction block of the at least one instruction block in the second contact workflow; and
select the third instruction block in the first contact workflow as the starting instruction block for the first contact workflow.

19. The computer system of claim 17, wherein the first contact workflow engine comprises an interactive voice response (IVR) workflow engine and the second contact workflow engine comprises a web application workflow engine.

20. The computer system of claim 19, wherein the system is further to:
- determine an IVR call queue associated with at least one attribute associated with the contact identifier;
- determine a third instruction block of the plurality of instruction blocks in the first contact workflow that provides access to the IVR call queue;
- select the third instruction block in the first contact workflow as the starting instruction block for the first contact workflow; and
- provide at least a portion of a sequence of instruction blocks invoked during the previous interaction with the second contact workflow for display by an interface associated with the third instruction block, wherein the sequence of instruction blocks comprises the at least one instruction block.

* * * * *